United States Patent [19]
Griffin

[11] Patent Number: 5,622,233
[45] Date of Patent: Apr. 22, 1997

[54] ELEMENTS FACED WITH SUPERHARD MATERIALS

[75] Inventor: Nigel D. Griffin, Whitminster, England

[73] Assignee: Camco Drilling Group Limited, of Hycalog, Stonehouse, England

[21] Appl. No.: 491,061

[22] Filed: Jun. 16, 1995

[30] Foreign Application Priority Data

Jun. 18, 1994 [GB] United Kingdom .............. 9412247

[51] Int. Cl.⁶ ................................................ E21B 10/46
[52] U.S. Cl. ........................................ 175/432; 51/293
[58] Field of Search ................................ 175/432, 428, 175/431, 430; 51/293, 295

[56] References Cited

U.S. PATENT DOCUMENTS 4,784,023  11/1988  Dennis .................................. 76/108 A
5,120,327  6/1992  Dennis .................................. 51/293

FOREIGN PATENT DOCUMENTS 2283772  11/1994  United Kingdom .
2275068  1/1995  United Kingdom .

*Primary Examiner*—Hoang C. Dang

[57] ABSTRACT

A preform element, for example for use as a cutter in a rotary drill bit, includes a facing table of polycrystalline diamond bonded to a substrate of tungsten carbide. The rear surface of the facing table is integrally formed with a plurality of protuberances which project into the substrate and are spaced apart irregularly across the rear surface of the facing table. The protuberances may differ in cross-sectional shape and/or size, and the distribution of the different sizes and/or shapes may also be irregular. The protuberances may also project into the substrate to irregularly varying depths.

5 Claims, 2 Drawing Sheets

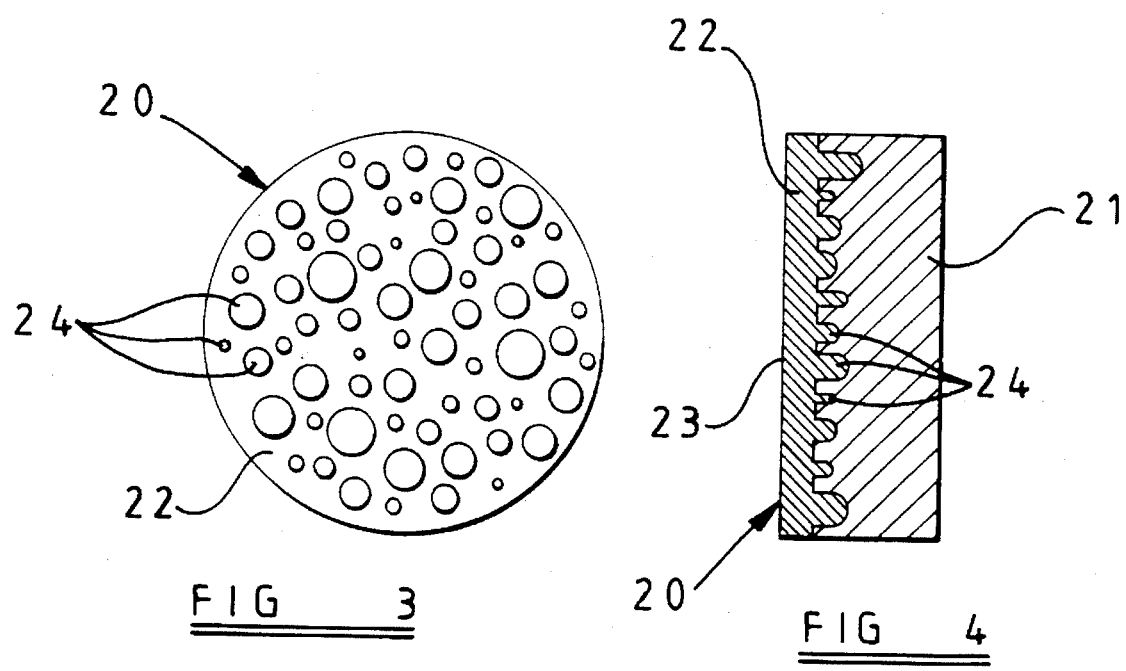

ELEMENTS FACED WITH SUPERHARD MATERIALS

BACKGROUND OF THE INVENTION

The invention relates to elements faced with superhard material, and particularly to preform elements comprising a facing table of superhard material having a front face, a peripheral surface, and a rear surface bonded to a substrate of material which is less hard than the superhard material.

Preform elements of this kind are often used as cutting elements on rotary drag-type drill bits, and the present invention will be particularly described in relation to such use. However, the invention is not restricted to cutting elements for this particular use, and may relate to preform elements for other purposes. For example, elements faced with superhard material, of the kind referred to, may also be employed in work piece-shaping tools, high pressure nozzles, wire-drawing dies, bearings and other parts subject to sliding wear, as well as elements subject to percussive loads as may be the case in tappets, cams, cam followers, and similar devices in which a surface of high wear resistance is required.

Preform elements used as cutting elements in rotary drill bits usually have a facing table of polycrystalline diamond, although other superhard materials are available, such as cubic boron nitride and amorphous diamond-like carbon (ADLC). The substrate of less hard material is often formed from cemented tungsten carbide, and the facing table and substrate are bonded together during formation of the element in a high pressure, high temperature forming press. This forming process is well known and will not be described in detail.

Each preform cutting element may be mounted on a carrier in the form of a generally cylindrical stud or post received in a socket in the body of the drill bit. The carrier is often formed from cemented tungsten carbide, the surface of the substrate being brazed to a surface on the carrier, for example by a process known as "LS bonding". Alternatively, the substrate itself may be of sufficient thickness as to provide, in effect, a cylindrical stud which is sufficiently long to be directly received in a socket in the bit body, without being brazed to a carrier. The bit body itself may be machined from metal, usually steel, or may be molded using a powder metallurgy process.

Such cutting elements are subjected to extremes of temperature during formation and mounting on the bit body, and are also subjected to high temperatures and heavy loads when the drill is in use down a borehole. It is found that as a result of such conditions spalling and delamination of the superhard facing table can occur, that is to say the separation and loss of the diamond or other superhard material over the cutting surface of the table. This may also occur in preform elements used for other purposes, and particularly where the elements are subjected to repetitive percussive loads, as in tappets and cam mechanisms.

Commonly, in preform elements of the above type the interface between the superhard table and the substrate has usually been flat and planar. However, particularly in cutting elements for drill bits, attempts have been made to improve the bond between the superhard facing table and the substrate by configuring the rear face of the facing table so as to provide a degree of mechanical interlocking between the facing table and substrate. One such arrangement is shown in U.S. Pat. No. 5,120,327 where the rear surface of the facing table is integrally formed with a plurality of identical spaced apart parallel ridges of constant depth. The facing table also includes a peripheral ring of greater thickness, the extremities of the parallel ridges intersecting the surrounding ring. U.S. Pat. No. 4,784,023 illustrates a similar arrangement but without the peripheral ring.

While such cutting elements have met with some success in the field, they suffer from certain serious disadvantages. Since the ridges on the facing table are parallel and extend from one side of the cutting element to the other, it is necessary to ensure that the cutting element is mounted on the drill bit in the correct rotational orientation, since it is desirable that the cutting edge, i.e. the part of the periphery of the facing table which engages the formation during drilling, extends across the ends of the ridges. This leads to difficulties, during manufacture, in mounting such cutting elements in the correct orientation on the posts, since many posts are not mounted on the bit body so as to be perpendicular to the formation. Thus the required orientation of the cutting element on the post depends upon the ultimate orientation and alignment of the post when mounted on the bit body.

One of the main purposes of providing the above-mentioned ridges on the facing table is to improve the bonding between the facing table and the substrate by accommodating the distortion which results from heating of the cutting assembly during manufacture, both during formation of the cutting element itself, and in its subsequent bonding onto a carrier. Such distortion results from the difference in coefficient of thermal expansion between the superhard material of the facing table and the less hard material of the substrate. Since the cutting elements of the kind referred to above are not symmetrical about the central axis, the distortion as a result of heating is also not symmetrical. Thus little distortion may be found along the plane of the ridges, but considerable distortion may be evident perpendicular to the ridges. This can therefore lead to splitting along the line of the ridges when the cutting element is subjected to high temperatures, for example when bonding to a carrier.

Given the difference in properties between the superhard material and the material of the substrate, a stress condition is always established Between the facing table and the substrate. This stress is generally radial and the intensity of the stress increases with distance from the center of the cutter. The prior art cutting elements take no account of this and provide no arrangement for accommodating the increasing stress at the outer radial positions. The opposite extremities of the parallel ridges provide some reinforcement of the outer peripheral ring on two diametrically opposed portions of the peripheral ring but provide no such support for the opposed portions of the ring which lie at opposite ends of a diameter at right angles to the ridges.

The present invention relates to a novel form of preform element where the rear surface of the facing table, which is bonded to the substrate, has a novel configuration intended to overcome some or all of the above-mentioned problems, while also providing other advantages.

SUMMARY OF THE INVENTION

According to the present invention, there is provided a preform element including a facing table of superhard material having a front face, a peripheral surface, and a rear surface bonded to a substrate which is less hard than the superhard material, the rear surface of the facing table being integrally formed with a plurality of protuberances which project into the substrate, said protuberances being spaced apart irregularly across the rear surface of the facing table.

The protuberances improve the bond between the facing table and the substrate to inhibit spalling and delamination, but since they are irregularly spaced the element has no axis of symmetry and so may be arranged in any orientation. The protuberances may differ in cross-sectional shape and/or size and may also differ in the depth to which they project into the substrate. Preferably the distribution of protuberances of different cross-section and/or of different depths is also irregular across the facing table. However, there may be advantage in the protuberances nearer the periphery of the element, or that part of the periphery which forms the cutting edge, being of greater average depth than the protuberances in other regions of the facing table.

BRIEF DESCRIPTION OF THE DRAWINGS

FIG. 3 is an underplan view of the superhard facing table of a preform element in accordance with the invention, the substrate being removed.

FIG. 4 is a sectional view through the preform element of which FIG. 3 shows the facing table.

DETAILED DESCRIPTION OF THE PREFERRED EMBODIMENT

Figure 1:
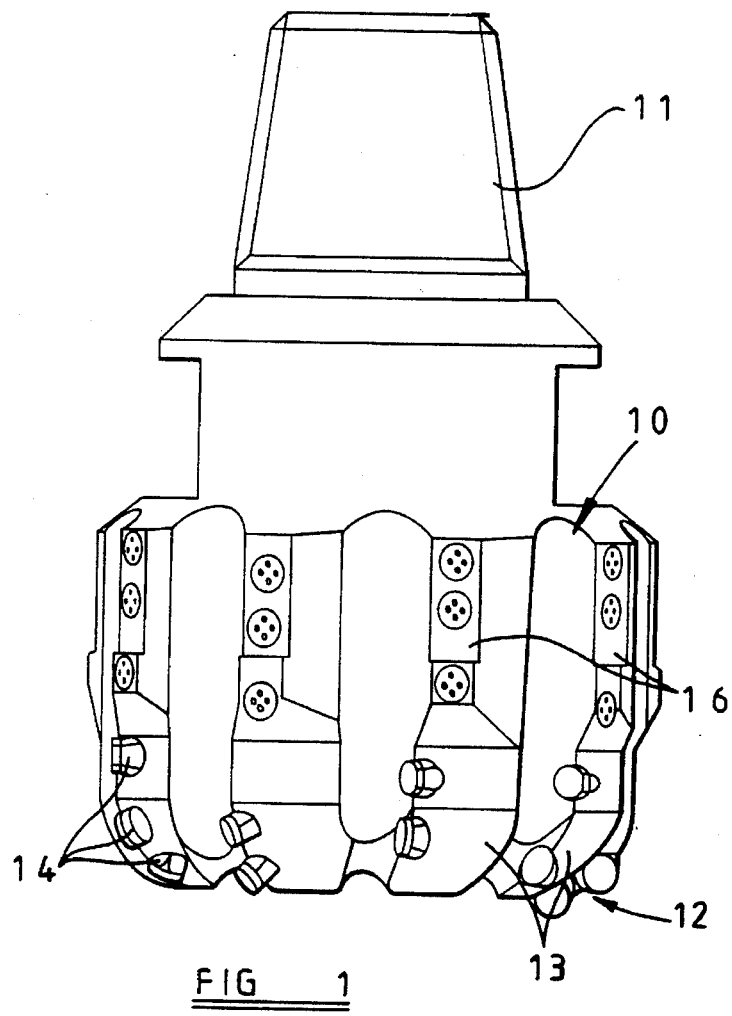
FIG. 1 is a side elevation of a typical drag-type drill bit in which cutting elements according to the present invention may be used.
Figure 2:
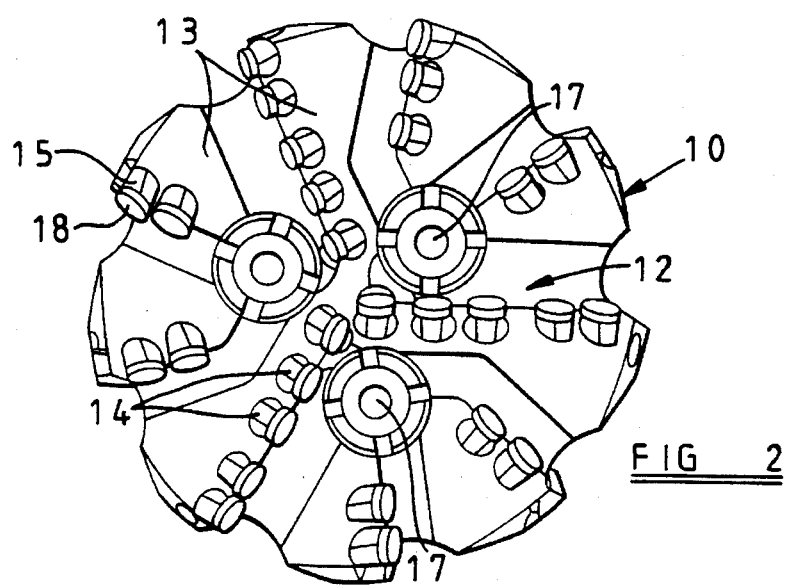
FIG. 2 is an end elevation of the drill bit shown in FIG. 1.

FIGS. 1 and 2 show a typical full bore drag-bit of a kind to which cutting elements of the present invention are applicable. The bit body 10 is machined from steel and has a shank formed with an externally threaded tapered pin 11 at one end for connection to the drill string. The operative end face 12 of the bit body is formed with a number of blades 13 radiating from the central area of the bit, and the blades carry cutter assemblies 14 spaced apart along the length thereof. The bit has a gauge section including kickers 16 which contact the walls of the borehole to stabilize the bit in the borehole. A central passage (not shown) in the bit and shank delivers drilling fluid through nozzles 17 in the end face 12 in known manner.

Each cutter assembly 14 comprises a preform cutting element 18 mounted on a carrier 19 in the form of a post which is located in a socket in the bit body. Each preform cutting element is in the form of a circular tablet comprising a facing table of superhard material, usually polycrystalline diamond, bonded to a substrate which is normally of cemented tungsten carbide. The rear surface of the substrate is bonded, for example by LS bonding, to a suitably orientated surface on the post 19.

One form of preform cutting element for a rotary drill bit, in accordance with the present invention, is shown in FIGS. 3 and 4. The cutting element comprises a polycrystalline diamond front facing table 20 bonded to a cemented tungsten carbide substrate 21. The facing table 20 comprises a front flat layer 22 which provides the front cutting face 23 of the facing table. The rear surface of the polycrystalline diamond facing table 22 of the cutting element is formed with a plurality of protuberances 24 which project into the tungsten carbide substrate 21.

According to the invention, the protuberances 24 are arranged irregularly and in random fashion across the area of the facing table, so that the preform element has no axis of symmetry. Furthermore, in this particular arrangement the protuberances are of different sizes both in diameter and depth. The arrangement of protuberances of particular diameters and depth is also random across the area of the cutting element and is not in any regular pattern. The irregular arrangement allows the cutting element to be used in any rotational orientation. The random depths of the protuberances means that should a crack begin to be propagated across the substrate to the rear of the facing table, the crack will sooner or later meet a protuberance, thus inhibiting further propagation of the crack, since there is no continuous surface along which a crack may propagate without interruption. Although the depths of the protuberances are generally randomly arranged, the average depth preferably increases towards the periphery of the element, or towards a portion of the periphery which defines a cutting edge, so as oppose the tendency for delamination or spalling of the superhard facing table to be initiated adjacent the periphery.

In any of the above-described arrangements in accordance with the invention a transition layer may be provided between the facing table and the substrate. The transition layer may, for example, comprise polycrystalline diamond particles embedded in a tungsten carbide matrix.

Wherein the present invention has been described in particular relation to the drawings attached hereto, it should be understood that other and further modifications, apart from those shown or suggested herein, may be made within the scope and spirit of the present invention.

I claim:

1. A preform element including a facing table of superhard material having a front face, a peripheral surface, and a rear surface bonded to a substrate which is less hard than the superhard material, the rear surface of the facing table being integrally formed with a plurality of protuberances of substantially circular shape which project into the substrate, said protuberances being spaced apart randomly across substantially the whole of the rear surface of the facing table, and wherein the protuberances differ in the depth to which they project into the substrate and the distribution of protuberances of different depths is also random across the facing table.

2. A preform element according to claim 1, wherein the protuberances differ in cross-sectional size.

3. A preform element according to claim 1, wherein the protuberances differ in cross-sectional size, and wherein the distribution of protuberances of different cross-sectional or size is irregular across the facing table.

4. A preform element according to claim 1, wherein the protuberances nearer the periphery of the element, or that part of the periphery which forms a cutting edge, are of greater average depth than the protuberances in other regions of the facing table.

5. A preform element according to claim 1, wherein the preform element is substantially circular.

* * * * *